(12) United States Patent
Ito et al.

(10) Patent No.: US 7,542,668 B2
(45) Date of Patent: Jun. 2, 2009

(54) PHOTOGRAPHIC DEVICE

(75) Inventors: Masayuki Ito, Nagano (JP); Minoru Matsushima, Tokyo (JP)

(73) Assignee: OPT Corporation (JP)

(*) Notice: Subject to any disclaimer, the term of this patent is extended or adjusted under 35 U.S.C. 154(b) by 347 days.

(21) Appl. No.: 11/428,005

(22) Filed: Jun. 30, 2006

(65) Prior Publication Data

US 2008/0002962 A1 Jan. 3, 2008

(51) Int. Cl.
*G03B 17/18* (2006.01)

(52) U.S. Cl. .............................. 396/287; 348/36; 348/39

(58) Field of Classification Search ................ 396/287; 348/36, 39, 14.08, 14.09, 14.1, 14.11, 14.12, 348/14.13, 14.14, 14.15, 14.16
See application file for complete search history.

(56) References Cited

U.S. PATENT DOCUMENTS

| | | | | |
|---|---|---|---|---|
| 6,226,035 | B1 * | 5/2001 | Korein et al. ................ | 348/335 |
| 2003/0160862 | A1 * | 8/2003 | Charlier et al. .......... | 348/14.08 |
| 2003/0160868 | A1 * | 8/2003 | Kakou et al. ................ | 348/143 |
| 2004/0001137 | A1 * | 1/2004 | Cutler et al. ............. | 348/14.08 |
| 2004/0027451 | A1 * | 2/2004 | Baker .......................... | 348/46 |
| 2005/0041094 | A1 * | 2/2005 | Gal et al. ...................... | 348/36 |
| 2006/0088187 | A1 * | 4/2006 | Clarkson et al. ............ | 382/103 |

FOREIGN PATENT DOCUMENTS

| | | |
|---|---|---|
| JP | 2003-303342 | 10/2003 |
| JP | 2003-303347 | 10/2003 |
| JP | 2003-303348 | 10/2003 |
| JP | 2003-304532 | 10/2003 |
| JP | 2003-308526 | 10/2003 |
| JP | 2003-308539 | 10/2003 |

OTHER PUBLICATIONS

Patent Abstracts of Japan, Publication No. 2003-303335 published Oct. 24, 2003, Tateyama Machine KK and Sony Corp (Appln No. 2002-108489 filed Apr. 10, 2002).

* cited by examiner

*Primary Examiner*—Rochelle-Ann J Blackman
*Assistant Examiner*—Warren K Fenwick
(74) *Attorney, Agent, or Firm*—Stephen Chin; von Simson & Chin LLP

(57) ABSTRACT

A photographic device equipped with a camera capable of photographing a 360-degree all-round image at a time includes a memory for recording the all-round image photographed by the camera, a control unit for specifying a predetermined range within the all-round image, extracting an image of the predetermined range from the memory to display the image, and for extracting and displaying the image within the all-round image recorded in the memory by changing a position of the predetermined range, thereby displaying the image as if the predetermined range moves in a circumferential direction, and a display unit for displaying at least the image of the predetermined range.

5 Claims, 11 Drawing Sheets

| PAN SWITCH | LEFT/RIGHT SWITCH | A out | B out |
|---|---|---|---|
| OFF | — | Low | Low |
| ON | ON | PULSE SIGNAL | Low |
| ON | OFF | Low | PULSE SIGNAL |

PHOTOGRAPHIC DEVICE

BACKGROUND OF THE INVENTION

1. Field of the Invention

The present invention relates to a photographic device equipped with a camera capable of photographing an all-round image at a time.

2. Description of the Related Art

In general, when a 360-degree all-round panoramic image is photographed, one or more cameras capable of photographing a front side alone are used, and lens parts of the cameras are moved left and right. Then, many images photographed by the cameras are, for example, connected together to obtain the 360-degree all-round panoramic image.

However, the method has a drawback in that processing such as connection of the images is necessary. On the other hand, a camera, which can photograph a 360-degree all-round image at a time by using one 360-degree all-round lens, has been known.

This camera can photograph a 360-degree all-round image at a time to horizontally develop them into a panoramic image. However, because a resolution of the camera is generally not so high, even if an overall representation of the panoramically developed image can be checked, a part thereof cannot be checked in detail. When a displayed image is a static image, it is difficult to check whether a photographing operation is actually taking place or not. Besides, the displayed image, which is a static image, lacks visual interest.

SUMMARY OF THE INVENTION

It is therefore an object of the present invention to provide a photographic device capable of displaying a 360-degree all-round image at a time and also displaying a predetermined range within the image, simultaneously as if a camera is moving.

In order to solve the above problems, according to an aspect of the present invention, there is provided a photographic device equipped with a camera capable of photographing a 360-degree all-round image at a time, including: a memory for recording the all-round image photographed by the camera; a control unit for specifying a predetermined range within the all-round image, extracting an image of the predetermined range from the memory to display the image, and for extracting and displaying the image within the all-round image recorded in the memory by changing a position of the predetermined range, thereby displaying the image as if the predetermined range moves in a circumferential direction; and a display unit for displaying at least the image of the predetermined range.

With this configuration, the 360-degree all-round image can be displayed at a time, and the image of the predetermined range specified within the all-round image can be displayed as if the camera is moving. Thus, a movement appears in the image, and the execution of photographing can be recognized by a viewer.

According to another aspect of the present invention, a photographic device equipped with a camera capable of photographing a 360-degree all-round image at a time includes a display unit for simultaneously displaying the photographed all-round image developed into a panoramic image and an image of a predetermined range specified within the all-round image, and a control unit for displaying the image of the predetermined range as if the predetermined range moves in a circumferential direction. With this configuration, the 360-degree all-round panoramic image can be checked by the display unit, and the image of the predetermined range within the panoramic image can be checked in detail in a display form as if the camera moves by the same display unit.

BRIEF DESCRIPTION OF THE DRAWINGS

In the accompanying drawings:

FIG. 3A shows an picked-up image obtained by an image pickup element, and FIG. 3B shows a panoramic image obtained by processing the image of FIG. 3A and horizontally developing it;

FIG. 7A shows an entire image where the panoramic image and the zoom image are simultaneously displayed respectively in a lower screen portion and an upper screen portion, and FIG. 7B shows an entire image where a portion equivalent to a zoom area of the panoramic image is indicated by hatching;

FIG. 9 is a diagram showing a state of a pulse generated when a pan switch and a left and right switch shown in FIG. 8 are turned ON or OFF;

DETAILED DESCRIPTION OF THE PREFERRED EMBODIMENTS

Figure 1:
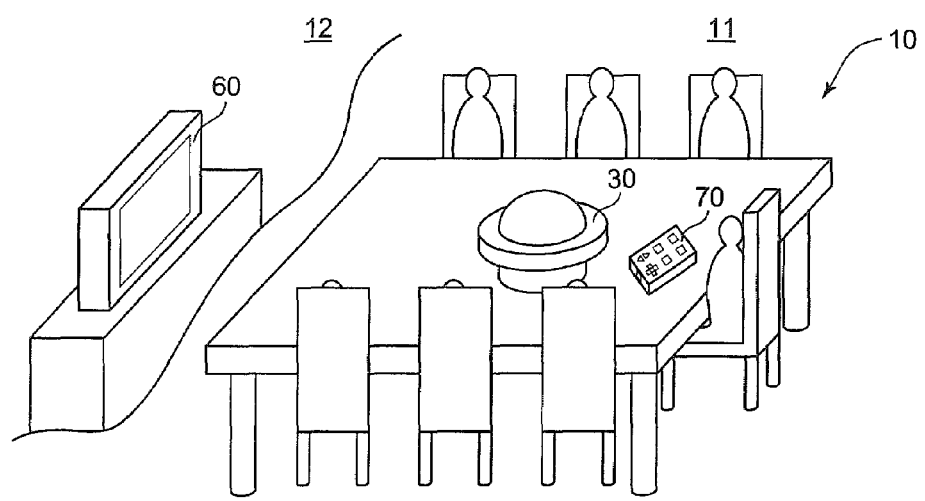
FIG. 1 is a diagram showing a photographic device according to an embodiment of the present invention.

Referring to FIGS. 1 to 12, a photographic device 10 of an embodiment of the present invention will be described below. FIG. 1 shows a case where a camera side of the photographic device 10 is installed in, e.g., a conference room 11, and a display unit side is installed in a different room 12.

As shown in FIG. 1, the photographic device 10 mainly includes a camera 30 which is set in the conference room 11 and capable of photographing a 360-degree all-round image at a time, a display unit 60 disposed in the different room 12 to display the image photographed by the camera 30, and a remote control 70 for operating the image displayed in the display unit 60. According to the embodiment, the remote control 70 is arranged in the conference room 11. However, it may be arranged in the different room 12.

In the photographic device 10, the all-round image photographed by the camera 30 is displayed in the display unit 60. Simultaneously, a predetermined range 64 is specified within the image displayed in the display unit 60 (refer to FIGS. 7A and 7B). An image of the specified predetermined range 64 is also displayed along with the above image in the displayed unit 60.

In the photographic device 10, the predetermined range 64 specified among the image displayed in the display unit 60 moves in a circumferential direction (i.e., circumferential direction of an annular image 49 of FIG. 3A described below (left and right direction in FIGS. 7A and 7B). The movement (panning hereinafter) is accompanied by displaying of a new image stored in the predetermined range 64 in the display unit 60. In other words, an image subjected to pan-photographing is displayed in the display unit 60 simultaneously with the displaying of the all-round image of the camera 30.

Next, a configuration of the camera 30 will be described.

Figure 2:
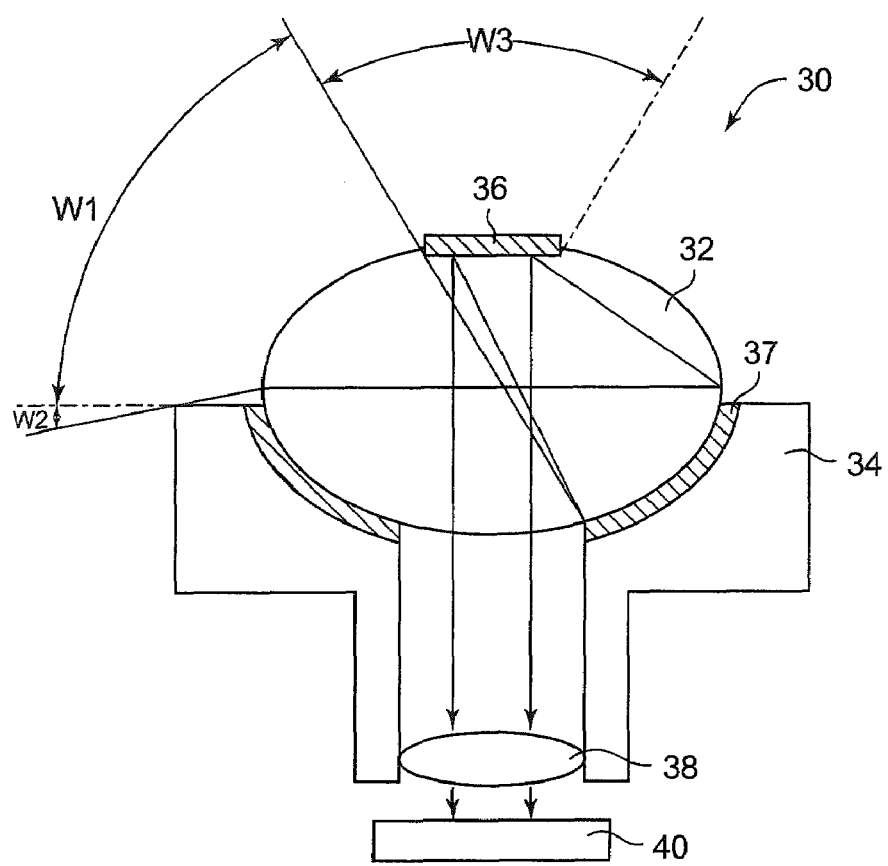
FIG. 2 is a sectional view showing a configuration of a camera used in the photographic device of FIG. 1.
Figure 3:
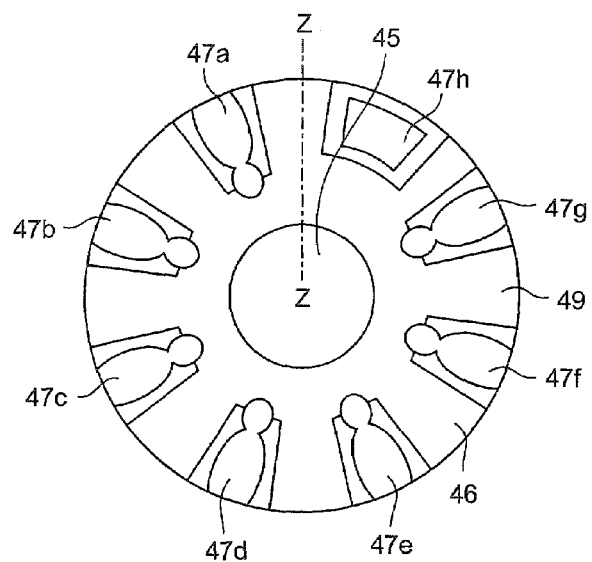
FIGS. 3A and 3B are imaginary diagrams of images obtained by the camera of FIG. 2, where
Figure 3:
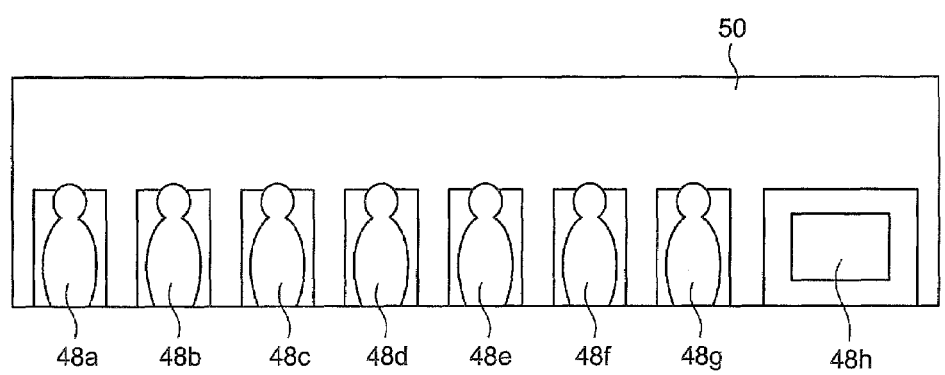

FIG. 2 is a sectional view showing main portions of the camera 30. As shown in FIG. 2, the camera 30 includes a spherical lens body 32, a holder 34 for holding the lens body 32, an apex reflection unit 36 disposed in an apex portion where the lens body 32 is exposed from the holder 34, a deep side reflection unit 37 formed to cover an unexposed side of the lens body 32, a relay lens 38 for transmitting an image, and an image pickup element 40 constituted of a CCD.

As shown in FIG. 2, the lens body 32 is a lens made of a glass material and formed into a spherical shape in which an up-and-down direction section roughly becomes elliptic. A lower half portion of this lens body 32 is held in the holder 34. An upper half portion of the lens body 32 is exposed to the outside. The small circular apex reflection unit 36 is formed in an apex of the exposed portion. This apex reflection unit 36 does not transmit a light from the outside, but reflects a light made incident on the lens body 32 not to leak to the outside. The apex reflection unit 36 is formed by sputtering a reflection member on a surface of a circular concave disposed in the apex of the lens body 32.

An exposed portion excluding the apex reflection unit 36, i.e., a portion in a 360-degree circumferential direction, is a portion through which a light can be transmitted, and a 360-degree all-round image can be taken at a time. Accordingly, the camera 30 can photograph the 360-degree all-round image at a time. In the deep side reflection unit 37, a circular hole is formed in the apex which becomes a center of an unexposed side of the lens body 32. A light made incident on the lens body 32 is transmitted through this hole to pass through a relay lens 38. Then, the light enters the image pickup element 40 to be converted into an image signal.

The camera 30 can photograph an image of a total field angle range of an elevation angle W1 to the apex reflection unit 36 with a horizontal direction set as a reference and a depression angle W2 to a side opposed to the apex reflection unit 36 with the horizontal direction set as a reference. Conversely, a photographing disable angle W3 that inhibits photographing is set before the apex reflection unit 36. The angles W1 to W3 can be set arbitrarily. However, the elevation angle W1 is preferably set to 50 to 70°. The depression angle W2 is preferably set to 20 to 50°.

FIGS. 3A and 3B show picked-up images obtained by using the camera 30. As shown in FIG. 3A, a 360-degree all-round image picked up by the image pickup element 40 is annularly projected in an annular portion 46 which surrounds a circular portion 45. FIG. 3B shows an picked-up image obtained by developing an annular image 49 projected in the annular portion 46 into a horizontal panoramic image 50 with a Z-Z line as a border. Images 47*a* to 47*h* projected in the annular portion 46 are projected as images 48*a* to 48*h*, respectively, in the horizontally developed panoramic image 50.

The camera 30 described above is similar in kind to a conventionally known omnidirectional imaging camera. The development process of the annular image 49 into the panoramic image 50 is carried out by a method described in each of JP 2003-303335 A, JP 2003-303342 A, JP 2003-303347 A, JP 2003-303348 A, JP 2003-304532 A, JP 2003-308526 A, JP 2003-308539 A, and the like.

Figure 4:
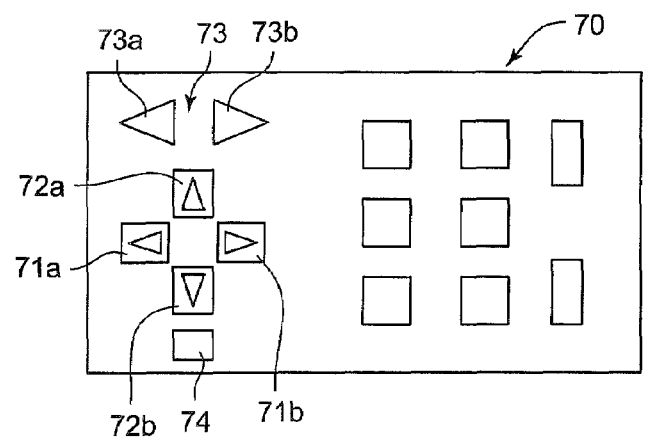
FIG. 4 is a plan view of a remote control used in the photographic device of FIG. 1.

The remote control 70 has a flat rectangular parallelepiped box shape. As shown in FIG. 4, a plurality of buttons are disposed on a left side (shown) of the remote control 70. A pan operation can be carried out by these buttons. A left-direction button 71*a* is a button for panning in a left direction, and a right-direction button 71*b* is a button for panning in a right direction. A left-and-right panning speed can be increased by an upwards button 72*a*, and reduced by a downwards button 72*b*. An ON/OFF button 74 is a button for turning a pan operation ON/OFF. A pan direction display unit 73 is disposed in a left upper part of the remote control 70. In the pan direction display unit 73, a left pan direction display unit 73*a* is lit red when panning is in a left direction, and a right pan direction display unit 73*b* is lit red when panning is in a right direction.

Next, a system configuration of the photographic device 10 will be described.

Figure 5:
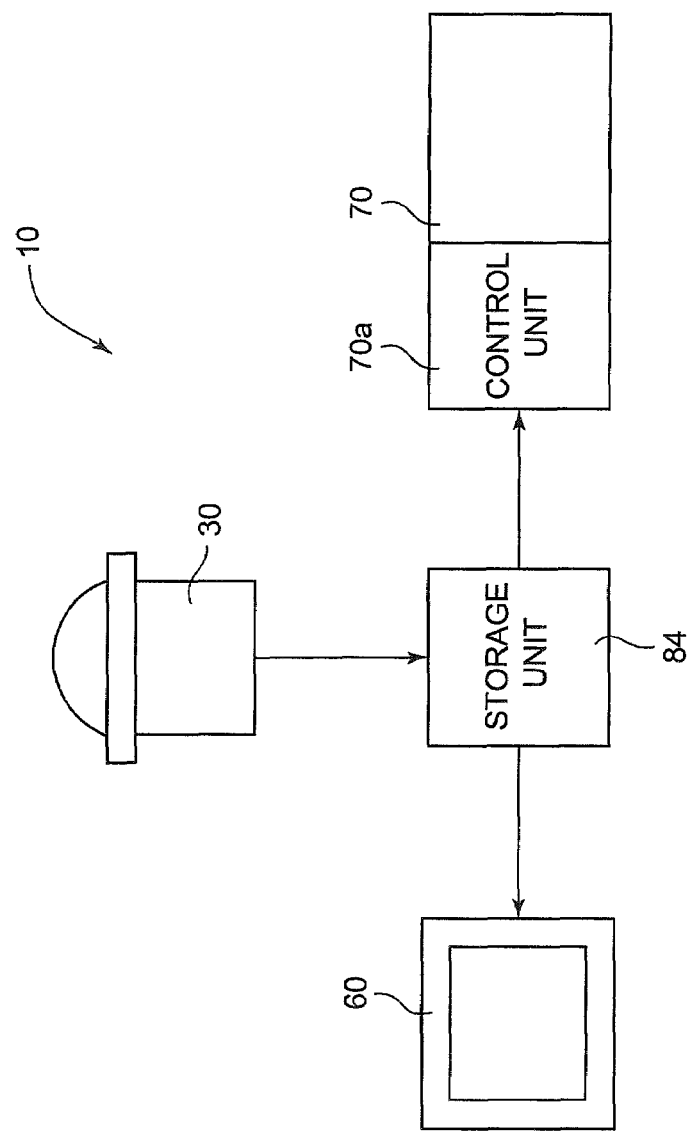
FIG. 5 is a diagram showing a system configuration of the photographic device of FIG. 1.

FIG. 5 shows the system configuration of the photographic device 10. The photographic device 10 mainly includes the camera 30, the display unit 60, the remote control 70, and a storage unit 84. The storage unit 84 may be arranged in one of the display unit 60, the remote control 70, and the camera 30, instead of being separately disposed.

Figure 6:
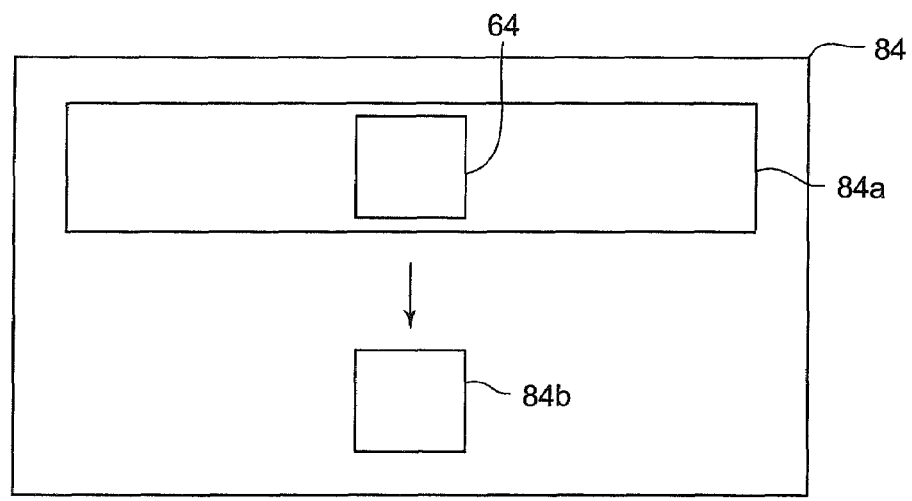
FIG. 6 is a diagram showing a detailed configuration of a storage unit shown in the system configuration of FIG. 5.
Figure 7:
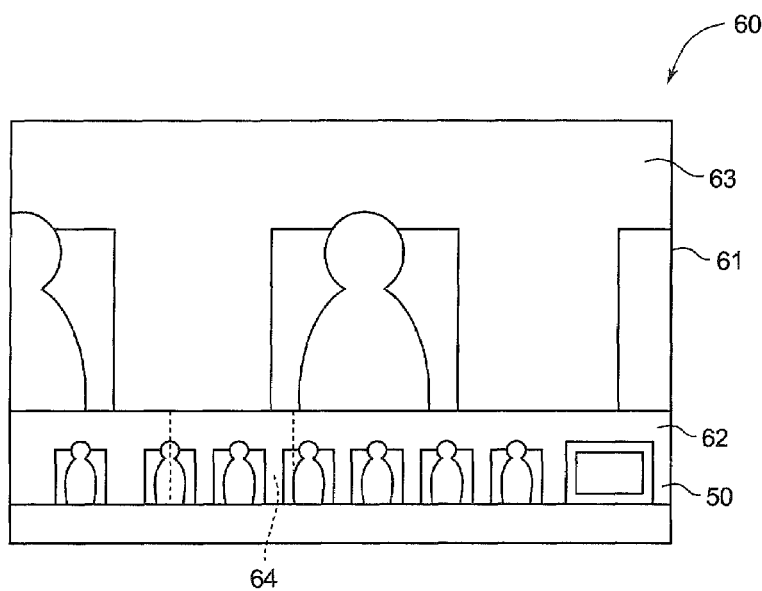
FIGS. 7A and 7B are diagrams showing a panoramic image and a zoom image displayed in a display unit of the photographic device of FIG. 1, where
Figure 7:
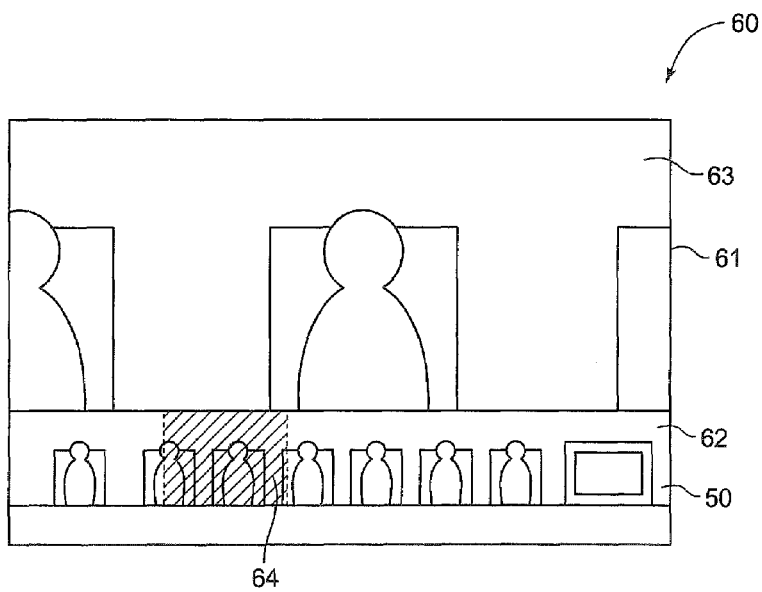

The camera 30 photographs an all-round image around the camera 30 as the annular image 49 at fixed intervals, and then transmits the image to the storage unit 84. As shown in FIG. 6, the storage unit 84 includes a memory 84*a* for storing all data equivalent to the annular image 49, and a video memory 84*b* for holding data displayed in the display unit 60. FIG. 6 shows the memory 84*a* and the video memory 84*b* based on their data volumes. In other words, as shown in FIG. 6, the data volume of the memory 84*a* is larger than that of the video memory 84*b*.

In the photographic device 10, data of the annular image 49 photographed by the camera 30 is transmitted to the memory 84*a* arranged in the storage unit 84. The annular image 49 is developed into the horizontal panoramic image 50 (refer to FIGS. 3A and 3B) in the memory 84*a*. Data of the developed panoramic image 50 is stored in the memory 84*a* for a fixed period. In other words, the entire data of the annular image 49 taken by the camera 30 is sent to the storage unit 84, and the data of the panoramic image 50 is stored in the memory 84*a* of the storage unit 84. Then, the horizontally developed panoramic image 50 is projected in a lower screen portion 62 (refer to FIG. 7A) of the entire screen 61 of the display unit 60.

As shown in FIGS. 7A and 7B, a portion 64 (zoom area hereinafter) of a predetermined range of the horizontally developed panoramic image 50 is expanded to be projected in an upper screen portion 63 of the entire screen 61. Data of the image projected in the upper screen portion 63 is stored in the video memory 84*b* arranged in the storage unit 84. In other words, the data of the image (image of the zoom area 64) projected in the upper screen portion 63 is extracted from the memory 84*a* in which the data of the panoramic image 50 has been stored, and stored in the video memory 84*b*.

A portion of the panoramic image 50 equivalent to the zoom area 64 can be panned left and right by operating the remote control 70. A left and right pan speed can also be adjusted by operating the remote control 70. When the portion equivalent to the zoom area 64 is panned left and right by operating the remote control 70, the zoom area 64 is moved left and right by a pan operation. An image stored in the zoom area 64 (zoom image hereinafter) is expanded to be projected in the upper screen portion 63.

As described above, the data corresponding to the zoom image is stored in the video memory 84b. When the zoom area 64 is panned left and right, data of a zoom image newly projected in the upper screen portion 63 accompanying the pan operation replaces the data of the zoom image which has been projected in the upper screen portion 63 to be stored in the video memory 84b. The storage of the image data in the video memory 84b accompanying the pan operation is carried out by a first-in first-out (FIFO) operation. The FIFO means a system for processing stored data in a stored sequence. In other words, according to the embodiment, when a capacity of the video memory 84b reaches its limit, previously stored image data (oldest image data) is deleted, and new image data is stored. The pan speed changes in proportion to a storage speed of the image data in the video memory 84b.

A control unit 70a is arranged in the remote control 70 (refer to FIG. 5). The left-and-right pan speed is controlled by this control unit 70a.

Figure 8:
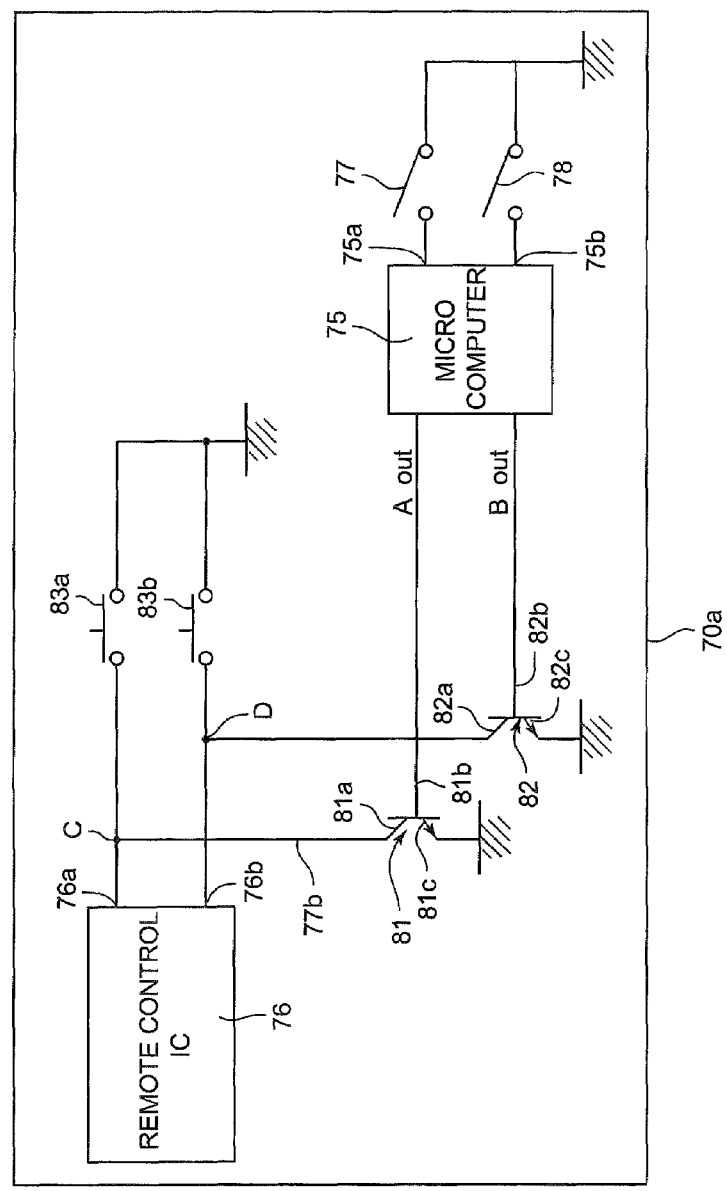
FIG. 8 is a diagram showing a detailed configuration of the control unit shown in the system configuration of FIG. 5.

As shown in FIG. 8, the control unit 70a mainly includes a microcomputer 75 for generating a pulse signal and controlling the pulse signal, a remote control IC 76 equipped with terminals 76a and 76b to detect signals input to the terminals 76a and 76b and to transmit the signals to the storage unit 84, a pan switch 77 for performing a pan operation, a left/right switch 78 for deciding a panning direction, a left pan switch 83a for panning left, a right pan switch 83b for panning right, and transistors 81 and 82.

A collector terminal 81a of the transistor 81 is connected to the terminal 76a of the remote control IC 76. A base terminal 81b of the transistor 81 is connected to the microcomputer 75. An emitter terminal 81c of the transistor 81 is grounded. A collector terminal 82a of the transistor 82 is connected to the terminal 76b of the remote control IC 76. A base terminal 82b of the transistor 82 is connected to the microcomputer 75. An emitter terminal 82c of the transistor 82 is grounded. Further, the terminal 76a of the remote control IC 76 is made conductive by pressing the left pan switch 83a to be grounded. The terminal 76b of the remote control IC 76 is made conductive by pressing the right pan switch 83b to be grounded. A terminal 75a of the microcomputer 75 can be connected to one end of the pan switch 77, and grounded when connected thereto. A terminal 75b of the microcomputer 75 can be connected to one end of the pan switch 78 as in the case of the terminal 75a, and grounded when connected thereto.

The pan speed is controlled by the microcomputer 75 arranged in the control unit 70a of the remote control 70, or a field programmable gate array (FPGA). As a control method, PWM control is employed, which adds a pulse signal generated by the microcomputer 75 or the FPGA to a switch terminal of the remote control IC 76, and changes a ratio of ON and OFF times of the pulse signal to control an output voltage. The PWM control is carried out by the microcomputer 75. However, a PWM control circuit may be arranged outside the microcomputer 75.

In FIG. 8, signals Aout and Bout output from the microcomputer 75 are decided by an ON and OFF combination of the pan switch 77 and the left/right switch 78 as shown in FIG. 9. A direction of a left/right pan operation is decided by the signals Aout and Bout output based on the ON and OFF combination of the switches 77 and 78. The pan switch 77 corresponds to the ON/OFF button 74, and the left/right switch 78 corresponds to the left-direction button 71a and the right-direction button 71b.

As shown in FIG. 9, when the pan switch 77 is OFF, the signals Aout and Bout both become signals of 0 [v] having no pulse applied thereto (LOW level signals (LOW signals hereinafter)). In this case, no pan operation is performed. When the pan switch 77 is ON and the left/right switch 78 is ON, the signal Aout becomes a pulse signal while the signal Bout becomes a LOW signal. In this case, left panning is executed. When the pan switch 77 is ON and the left/right switch 78 is OFF, the signal Aout becomes a LOW signal while the signal Bout becomes a pulse signal. In this case, right panning is executed. These pulse signals are the pulse signals after the PWM control is carried out by the microcomputer 75. The case where the left/right switch 78 is ON corresponds to the case where the left-direction button 71a is pressed, and the case where the left/right switch 78 is OFF corresponds to the case where the right-direction button 71b is pressed.

Figure 10:
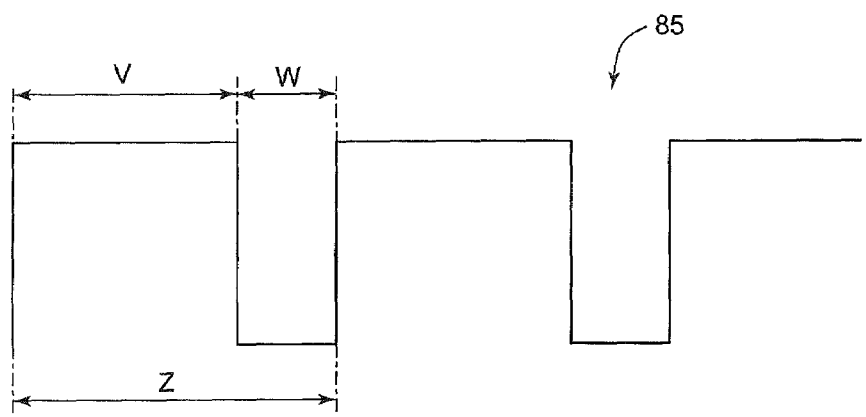
FIG. 10 is a diagram showing an example of a waveform of a pulse signal generated in the control unit of the photographic device of FIG. 1.

A waveform 85 of the pulse signal output from the microcomputer 75 in FIG. 8 has a shape similar to that shown in FIG. 10. In FIG. 10, V denotes an ON time of the pulse signal, and W denotes an OFF time of the pulse signal. The control of the pan speed based on the PWM control is carried out by changing a ratio of the ON time V and the OFF time W (simply V and W hereinafter) of the pulse signal within one cycle Z to control an output voltage. In the case of V>W, the output voltage becomes high to increase the pan speed. On the other hand, in the case of V<W, the output voltage becomes low to reduce the pan speed. In other words, the pan speed is faster as a ratio of V to Z is larger, and the pan speed is slower as the ratio is smaller.

When the pan switch 77 is OFF, neither of the signals Aout and Bout becomes a pulse signal. In other words, the signals Aout and Bout both become LOW signals. In this case, the transistors 81 and 82 both become OFF (cutoff state), and the terminals 76a and 76b of the remote control IC 76 are maintained at high levels. The remote control IC 76 starts to send a pan signal to the storage unit 84 when potentials of the points C and D are detected to be 0 [V]. Thus, in this case, no pan signal is transmitted to the storage unit 84.

When the pan switch 77 and the left/right switch 78 are both ON, the signal Aout becomes a pulse signal while the signal Bout becomes a LOW signal. In this case, the transistor 82 is turned OFF, the terminal 76b of the remote control IC 76 is maintained at a high level, and no panning is carried out in the right direction. On the other hand, as the signal Aout is a pulse signal, in the ON time V of FIG. 10, the transistor 81 is turned ON (conductive) to ground a conductor 77b. At this time, the potential of the point C becomes 0 [V]. When the pulse is in the OFF time W of FIG. 10, no current flows to the conductor 77b, and the potential of the point C is no longer 0 [V].

The remote control IC 76 starts to transmit a left pan signal to the storage unit 84 when the potential of the point C becomes 0 [V]. A pan speed is decided based on a size of V as described above.

If the left/right switch 78 is OFF while the pan switch 77 is ON, conversely to the above, the potential of the point C is no longer 0 [V], and the potential of the point D repeats 0 [V] and non-0 [V] based on a controlled pulse. When the potential of the point D becomes 0 [V] for the first time, a right pan signal is started to be transmitted from the remote control IC 76 to the storage unit 84.

In the control unit 70a, normally, the left and right pan switches 83a and 83b are both OFF. However, when the microcomputer 75 fails to operate properly, by turning ON the left and right pan switches 83a and 83b to set the potential of the point C or D to be 0 [V], a left or right pan signal can be transmitted from the remote control IC 76 to the storage unit 84.

In the photographic device 10, as the display unit 60 and the storage unit 84 are separate from each other, the left/right pan signal to be sent from the remote control IC 76 to the storage unit 84 is transmitted by a radio signal such as an infrared ray. This transmitted signal controls a speed of storage of the image data in the video memory 84b by the FIFO operation. Accordingly, the control of the pan operation is carried out based on a control signal from the outside structure such as the remote control 70.

Next, an operation of the photographic device 10 will be described.

As shown in FIG. 1, a case where the photographic device 10 is arranged separately in the conference room 11 and the different room 12 will be described. In this case, as described above, first, the camera 30 photographs its all-round image as an annular image 49. This image is developed into a panoramic image 50 in the memory 84a arranged in the storage unit 84 to be stored in the memory 84a. Data of a zoom image is taken from the memory 84a, in which data of the panoramic image 50 has been stored, into the video memory 84b to be stored therein. Then, the horizontally developed panoramic image 50 and the zoom image of the zoom area 64 are respectively displayed in the lower and upper screen portions 62 and 63 of the entire screen 61 of the display unit 60 (refer to FIGS. 7A and 7B).

In this case, portions of the panoramic image 50 displayed on the entire screen 61 corresponding to the zoom image displayed in the upper screen portion 63 is hatched (refer to FIG. 7B). Thus, it is easy to recognize which portion of the panoramic image 50 is zoomed.

In the photographic device 10, when its power is turned ON, a state of a static image shown in FIG. 7A is displayed in the display unit 60. To perform a pan operation from the state of this static image, the ON/OFF button 74 of the remote control 70 is pressed. Regarding the left/right pan operation of the zoom area 64, as descried above, left panning is executed when the left-direction button 71a of the remote control 70 is pressed and right panning is executed when the right-direction button 71b is pressed. A left/right pan speed is adjusted by the upwards and downwards buttons 72a and 72b. To stop the pan operation, the ON/OFF button 74 is pressed again. The pan direction display unit 73 is disposed in the left upper side of the remote control 70. The left pan direction display unit 73a is lit red when panning is executed left, and the right pan direction display unit 73b is lit red when panning is executed right.

As described above, the control of this pan operation is carried out by subjecting a pulse signal to the PWM control at the control unit 70a of the remote control 70. In other words, the pulse signal that has been subjected to the PWM control controls a speed of storage of the image data in the video memory 84b of the storage unit 84. Thus, the pulse signal that has been subjected to the PWM control controls the pan speed. Accordingly, the pan speed can be controlled by the remote control 70, the storage speed in the video memory 84b is increased when the button 72a of the remote control 70 is pressed, and the storage speed in the video memory 84b is reduced when the button 72b is pressed.

During the pan operation, the hatched portion of the panoramic image 50 displayed in the lower screen portion 62 corresponding to the zoom area 64 moves in the panning direction. In the panoramic image 50, an image whose hatched part corresponding to the zoom area 64 moves is displayed, and the zoom image is simultaneously expanded to be displayed in the upper screen portion 63. In other words, the zoom area 64 is displayed in the upper screen portion 63, as if it is pan-photographed.

The photographic device 10 thus configured includes the memory 84a for storing the panoramic image 50 for a fixed period, the control unit 70a for specifying the zoom area 64 in the panoramic image 50 to extract the zoom image from the memory 84a and to display it, and changing the position of the zoom area 64 of the panoramic image 50 stored in the memory 84a, and the display unit 60 equipped with the lower and upper screen portions 62 and 63. Accordingly, the all-round image photographed by the camera 30 is displayed as the all-round panoramic image 50 in the display unit 60, and the image in which the zoom area 64 of the panoramic image 50 is moved in the circumferential direction is simultaneously displayed in the display unit 60.

In the photographic device 10, the PWM control is employed for controlling the pan speed of the zoom area 64. In other words, the speed control of the movement of the zoom area 64 is carried out by the control unit 70a, changing the ratio of ON and OFF times of the pulse signal to control the output signal, and controlling the image extracting speed from the memory 84a. Thus, it is possible to control the pan speed (moving speed of the zoom area 64) by a simple operation of changing the ratio of the ON and OFF times of the pulse signal.

In the photographic device 10, the data corresponding to the zoom area 64 is stored in the video memory 84b by the FIFO operation when the pan operation is carried out. In other words, in the photographic device 10, when the pan operation is carried out, the data corresponding to the zoom image is stored in the video memory 84b by the FIFO operation. Accordingly, even when the pan operation is carried out, the data always displayed in the display unit 60 alone is stored in the video memory 84b by the FIFO operation. Thus, the video memory 84b does not need a large capacity. Moreover, the video memory 84b never overflows due to excessive data storage. As a result, it is possible to deal with a case where a data processing becomes fast. As the pan operation is realized without any driving mechanism, it is possible to reduce costs, to improve reliability (durability), to miniaturize the photographic device 10, and to reduce power consumption.

In the photographic device 10, the all-round image is developed into the panoramic image 50, the panoramic image 50 is displayed in the lower screen portion 62, and the zoom image is simultaneously displayed in the upper screen portion 63. Accordingly, the all-round panoramic image 50 can be checked in the lower portion of the display unit 60, and details of the image of the zoom area 64 of the panoramic image 50 can be checked in the upper portion of the display unit 60. As a result, the screen becomes easier to be viewed, and the detailed contents can be checked while recognizing an overall state. When the zoom area 64 pans, the pan-direction movement of the zoom area 64 of the panoramic image 50 is accompanied by expansion of the zoom image to be displayed in the upper screen portion 63. Hence, since motion appears in the image, there can be provided an attractive image that allows a viewer to recognize execution of photographing.

In the photographic device 10, the portion of the panoramic image 50 corresponding to the zoom area 64 is hatched. Thus, it is possible to easily recognize which portion of the panoramic image 50 the zoom image displayed in expansion corresponds to.

In the photographic device 10, the control unit 70a is arranged in the remote control 70, and the pan direction display unit 73 is disposed in the remote control 70 to indicate the panning direction of the zoom area 64. Accordingly, it is possible to surely recognize the panning direction of the zoom area 64 by lighting the pan direction display unit 73 disposed in the remote control 70.

The embodiment of the present invention has been described above. However, various changes and modifications can be made.

According to the embodiment, the panoramic image 50 is displayed in the lower portion of the entire screen 61, and the zoom image of the zoom area 64 is displayed in the upper portion of the entire screen. However, other image arrangements may be employed. For example, conversely to the above, the panoramic image 50 may be displayed in the upper portion of the entire screen 61, and the zoom image may be displayed in the lower portion of the entire screen 61. According to the embodiment, a height ratio between the panoramic image 50 and the zoom image is 1:2.5. However, a preferable height ratio is 1:3 to 1:2 because of easier screen viewing.

According to the embodiment, the control of the pan speed is carried out by subjecting the pulse signal to the PWM control by the microcomputer 75 or the FPGA. However, variable resistance may be provided to the microcomputer 75 or the FPGA, and the pan speed may be controlled in proportion to the resistance.

According to the embodiment, the zoom area 64 is single-hatched to enable recognizing of the portion of the zoom area 64 of the panoramic image 50. However, the portion of the zoom area 64 may be recognized by surrounding an outer frame of the zoom area 64 with a line, double-hatching the zoom area 64, or making a display color of the zoom area 64 different from those of other portions.

According to the embodiment, the number of zoom areas 64 is one. However, a plurality of zoom areas 64 may be disposed in the panoramic image 50, and each of the images displayed in the zoom areas 64 may be expanded to be displayed in the upper screen portion 63.

Figure 11:
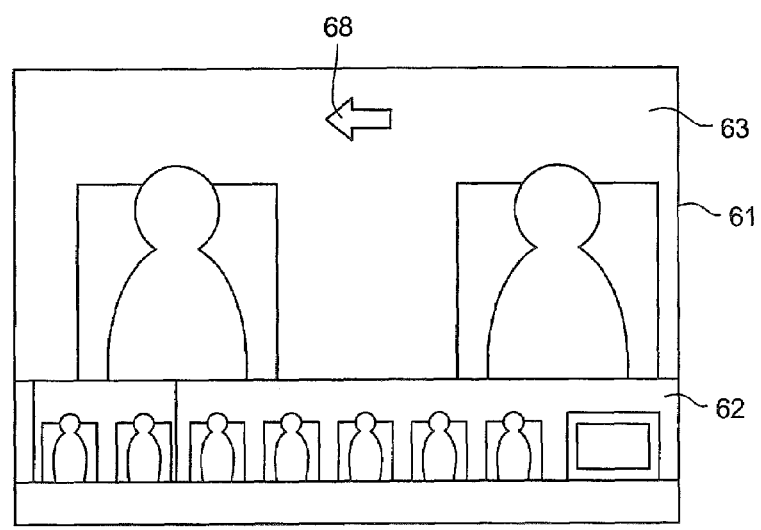
FIG. 11 is a diagram when an arrow is imposed in the upper screen portion of the entire image of each of FIGS. 7A and 7B.

According to the embodiment, no indication is made to clearly define which of the left and right sides a panning direction is in the upper screen portion 63. However, as shown in FIG. 11, an arrow 68 may be added to the upper screen portion 63, or a letter or any character may be added to clearly define a panning direction.

According to the embodiment, when the panning is executed left or right, the left pan direction display unit 73a or the right pan direction display unit 73b is lit red. However, other lighting colors may be employed. Flashing may be employed in place of lighting. Additionally, a speaker may be disposed in the remote control 70 to announce a direction of the panning operation by a voice from the remote control.

According to the embodiment, the pan operation is not carried out in a state immediately after the power for the photographic device 10 is turned ON. However, a pan operation may be carried out immediately after the power is turned ON. Each mode may be set in advance by operating the remote control 70.

Figure 12:
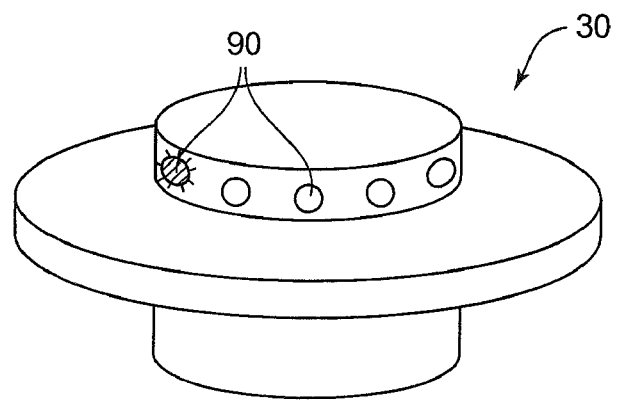
FIG. 12 is a diagram when a pan direction display unit is disposed in the camera of FIG.

As shown in FIG. 12, a plurality of pan direction display units 90 may be disposed in an entire outer periphery of the camera 30 to indicate which is a zoom image displaying direction. The pan direction display units 90 may be sequentially lit or flashed to clearly show its direction when panning is executed left or right.

According to the embodiment, sizes of the lower and upper screen portions 62 and 63 and the zoom area 64 are fixed in the entire screen 61 from the beginning. However, the sizes may be changed by operating the remote control 70.

The embodiment has been described presuming that the photographic device 10 is used separately in the conference room 11 and the different room 12. However, the photographic device 10 may be arranged in only one room, arranged separately in a room other than the conference room 11 and outdoors, or arranged only outdoors. The photographic device 10 may be used as a monitor camera, or for a WEB conference, a WEB class, or communication between family members or friends using the Internet.

As apparent from the foregoing, according to the present invention, it is possible to display the 360-degree all-round image at a time and to display the image of the predetermined range within the image simultaneously as if the camera moves.

What is claimed is:

1. A photographic device equipped with a camera capable of photographing a 360-degree all-round image, comprising:
   memory for recording the all-round image photographed by the camera;
   a control unit for
   (1) specifying a predetermined range within the all-round image,
   (2) extracting an image of the predetermined range from the memory,
   (3) displaying the image of the predetermined range,
   (4) moving the predetermined range in a circumferential direction,
   (5) extracting an image of the moved predetermined range from the memory, and
   (6) displaying the image of the moved predetermined range; and
   a display unit for serially displaying at least the image of the predetermined range and the image of the moved predetermined range
   wherein data corresponding to the image of the predetermined range is stored in a video memory, and wherein, when the predetermined range is moved in the circumferential direction, data corresponding to the image of the moved predetermined range displayed in the display unit is stored in the video memory by an operation of a FIFO, and wherein (1) the all-round image is developed into a panoramic image, (2) the panoramic image is horizontally developed in a lower position of the display unit to be displayed, and (3) the image of the predetermined range is expanded to be displayed in an upper position of the display unit.

2. A photographic device according to claim 1, wherein speed control of the movement of the predetermined range in the circumferential direction is carried out by the control unit, wherein the control unit (1) generates a pulse signal and (2) changes a ratio of ON and OFF times of the pulse signal, thus controlling a speed of extracting the image from the memory.

3. A photographic device according to claim 2, wherein a portion, corresponding to the image of the predetermined range displayed in the display unit, is additionally indicated in the panoramic image.

4. A photographic device according to claim 1, wherein a portion, corresponding to the image of the predetermined range displayed in the display unit, is additionally indicated in the panoramic image.

5. A photographic device according to claim 1, further comprising:
   a remote control device comprising:
   a display unit to indicate a moving direction of the image of the predetermined range;
   wherein the control unit is arranged in the remote control device; and
   wherein the remote control device is connected by radio or wire to a camera body having a photographic optical system arranged therein.

* * * * *